(12) United States Patent
Langhorst et al.

(10) Patent No.: US 10,084,741 B2
(45) Date of Patent: Sep. 25, 2018

(54) ANONYMOUS TWO WAY COMMUNICATIONS SYSTEM AND METHOD

(71) Applicant: GroupCast, LLC, St. Louis, MO (US)

(72) Inventors: Paul J. Langhorst, St. Louis, MO (US); Paul J. Meiners, St. Louis, MO (US); Joe H. Moore, Swansea, IL (US); Joseph R Palacios, St. Louis, MO (US); Kyle R Palacios, Columbia, IL (US)

(73) Assignee: West Corporation, Omaha, NE (US)

( * ) Notice: Subject to any disclaimer, the term of this patent is extended or adjusted under 35 U.S.C. 154(b) by 185 days.

(21) Appl. No.: 13/793,580

(22) Filed: Mar. 11, 2013

(65) Prior Publication Data
US 2014/0258421 A1    Sep. 11, 2014

(51) Int. Cl.
*H04L 12/58* (2006.01)
*H04W 12/02* (2009.01)
*H04L 29/06* (2006.01)

(52) U.S. Cl.
CPC ............ *H04L 51/28* (2013.01); *H04W 12/02* (2013.01); *H04L 63/0421* (2013.01)

(58) Field of Classification Search
CPC ....................................................... H04L 45/00
USPC ......................................................... 709/238
See application file for complete search history.

(56) References Cited

U.S. PATENT DOCUMENTS

| | | | |
|---|---|---|---|
| 5,884,272 A * | 3/1999 | Walker et al. ................. | 705/319 |
| 6,591,291 B1 * | 7/2003 | Gabber et al. ................. | 709/206 |
| 2004/0098625 A1 * | 5/2004 | Lagadec et al. ............... | 713/201 |
| 2010/0161747 A1 * | 6/2010 | Rayan et al. .................. | 709/206 |
| 2014/0089049 A1 * | 3/2014 | Cristofaro ..................... | 705/7.32 |

OTHER PUBLICATIONS

Microsoft, Understanding How Transport Rules Are Applied, technet.microsoft.com (5 pages).*

* cited by examiner

*Primary Examiner* — Wing F Chan
*Assistant Examiner* — Leon Y Tseng

(57) ABSTRACT

A system and method for allowing two-way anonymous communication. A message is received by the system, and a unique user ID is created and associated with the sender's contact information. The message if forwarded to the appropriate administrative user, along with the user ID but not the sender's contact information. A response from the administrative user may then be routed back to the sender by matching the user ID associated with the response with the contact information associated with that user ID. Thus, communication with possible without the parties knowing the identity of the other party.

6 Claims, 2 Drawing Sheets

ANONYMOUS TWO WAY COMMUNICATIONS SYSTEM AND METHOD

BACKGROUND OF THE INVENTION

Field of the Invention

The present invention relates to an anonymous two way communications system and method and, more particularly, to a communications system and method for rendering the sender of incoming calls, texts or other types of messages anonymous before forwarding same to the intended recipient, and allowing the recipient to respond to the original sender without knowing the identity of the sender.

Related Art

When a problem arises in many organizations, a report of the problem generally passes up the chain of command for consideration and possible action. For example, a worker may tell a supervisor about a malfunctioning machine, or that certain materials are running low. Such issues are typically reported fairly quickly, in part because they rarely involve much apprehension on the part of the person reporting the problem. Therefore, organizational management typically becomes aware of these types of standard problems fairly quickly, which allows for a fast response by the organization.

However, in some circumstances, members of an organization may feel uncomfortable reporting some problems. For example, if the problem relates to a superior of the person who would be reporting the problem, such as a worker's boss, the worker may be hesitant to report the problem for fear of reprisal. Alternatively, if the problem relates to a peer of the person reporting the problem, such as a classmate of a student, the student may similarly hesitate to report the problem for fear of being considered a "tattle-tale" or "snitch." Similarly, the problem may be a personal problem such as depression or suicidal thoughts, about which the person is embarrassed or scared, and fears that others may find out. Organizations, such as schools and businesses, often have a difficult time identifying and fixing issues such as bullying, harassment, etc. The people involved are often slow to report the problems, if the problems are ever reported at all.

Many organizations attempt to alleviate these issues by setting up call centers, hotlines, email addresses, etc., which purportedly allow members of the organization to send messages to management impersonally. While such techniques may have more success than implementing nothing at all (which thereby requires an in-person report of the problem), many people still feel uncomfortable reporting some problems via these methods. The call centers and email addresses are often hosted within the organization, such that the organization keeps a record of the telephone number of the incoming call or the email address of the incoming email. People are generally aware that with fairly minimal effort, someone within the organization could trace the source of the reporting call/email. As such, in reality, these call centers and email addresses often fail to alleviate any of the concerns which prevent people from reporting problems. Further, if the organizations were to actually ensure that no record of the source of the incoming message is kept, there is substantially no way for the management of the organization to seek further information from or report a resolution to the sender of the message.

SUMMARY OF THE INVENTION

The invention relates to a system and method for allowing anonymous two way communication between members of an organization, such as a school or business, and the management of the organization. The system includes a mechanism for receiving an incoming message, such as a voicemail message from an incoming telephone call, or a text message, or an email or the like. Preferably, the message is stored digitally along with contact information, such as a phone number or email address, for the sender of the message. An anonymizer then generates a unique user ID which is associated with the contact information in a database stored in an electronic memory. The user ID is preferably not user-selected, such as an internet "handle," but is instead a substantially random or encrypted identifier. An alert distributor then forwards the message to the appropriate administrative user via text, email or other electronic message, phone, etc.

A mobile app or web interface may allow the administrative user to compose an electronic message in response. Alternatively, the administrative user may communicate with the system via a text message or voicemail sent to a specified phone number to be received by the system. The unique user ID is preferably passed back to the system along with the administrative user's response message. Upon receiving the administrative user's response message, a decoder matches the unique user ID with the personal contact information of the original sender, and a response distributor forwards the administrative user's response message to the original sender.

In operation, preferably a dedicated telephone number (either a long code or a short code or both) and/or email address is created or set up. Upon receipt of an incoming call, text, email, etc., the message is received and electronically saved, along with contact information of the sender, e.g., telephone number, email address, etc. The anonymizer creates a unique user ID which is associated with the contact information in the database. Thereafter, the message is forwarded to an administrative user via the alert distributor, via one or more of text messaging, email, phone call/voicemail, etc. The unique user ID may be visible to the administrative user, or may simply remain associated with the message but unseen by the administrative user. In either case, the administrative user is not presented with any information which could be used to identify the sender of the message.

However, if a response to the original sender is warranted or necessary, the administrative user may compose and/or transmit such a message to the system. The recipient of the response message—i.e., the original sender—is determined by the decoder by re-associating the unique user ID with the original sender's stored contact information, and the response distributor sends the response message to the original sender. Thus, further messages may be transmitted back and forth in a chain between the sender and the administrative user without the administrative user knowing the identity of the sender (or without either party knowing the identity of the other). Any future correspondence in the chain with the original sender is preferably associated with the same user ID. It is recognized that different user IDs may be created each time a message is received within the chain, rather than relating each new message with the original unique user ID.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

It should be understood that the present drawings are not necessarily to scale and that the embodiments disclosed herein are sometimes illustrated by fragmentary views. In certain instances, details which are not necessary for an understanding of the present invention or which render other details difficult to perceive may have been omitted. It should also be understood that the invention is not necessarily limited to the particular embodiments illustrated herein. Like numbers utilized throughout the various figures designate like or similar parts or structure.

DETAILED DESCRIPTION

Figure 1:
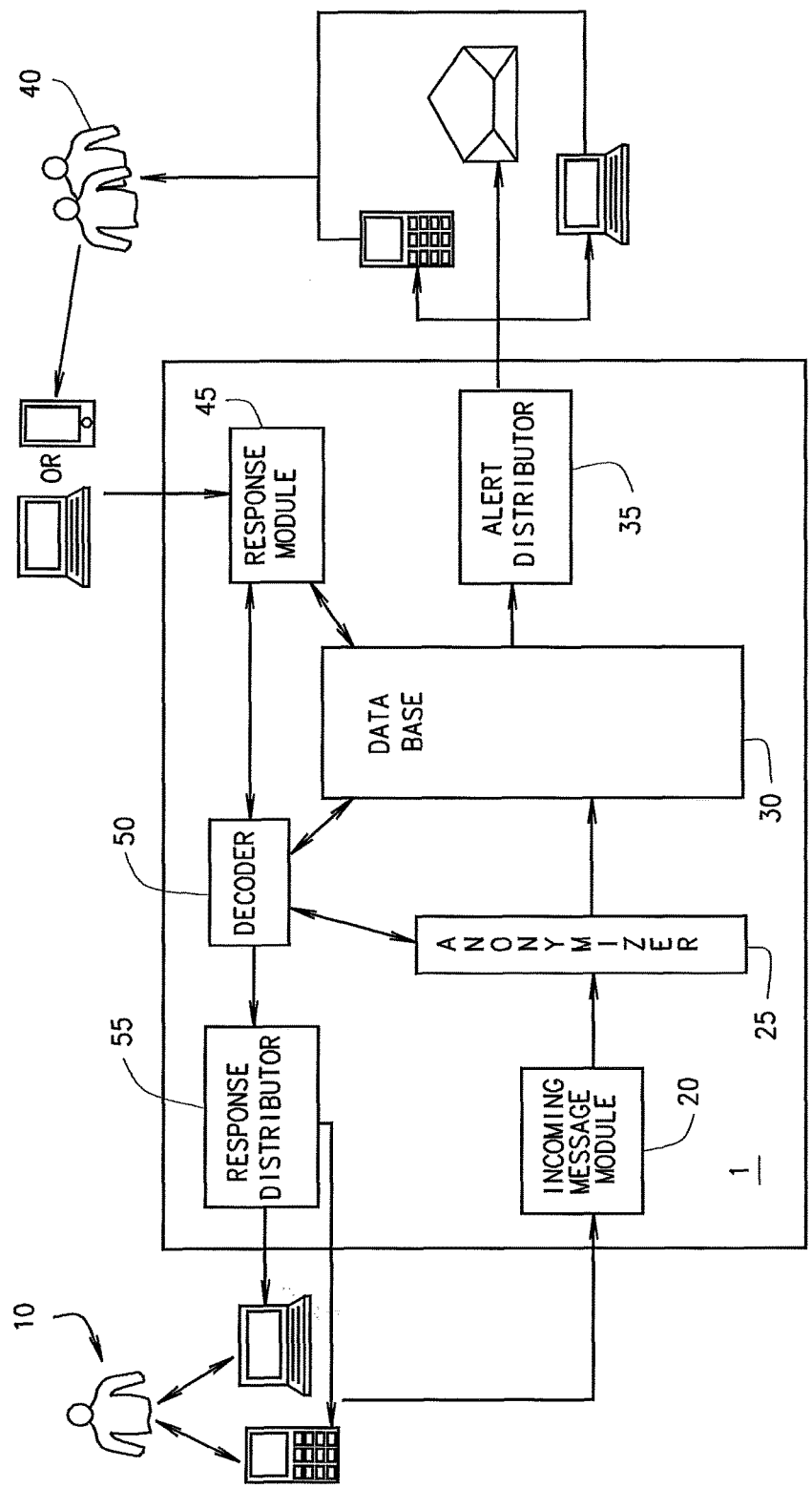
FIG. 1 is a block diagram depicting the components of the anonymous two way communications system according to one embodiment.

Referring now to the drawings, and more particularly to FIG. 1, a block diagram of an example anonymous two way communications system 1 is shown. Based on the following, it will be understood that system 1 incorporates at least one processor and electronic memory. The system 1 includes an incoming message module 20, which receives an incoming message from a user 10. The message may be in the form of a voicemail message, a text message, an email or other electronic message, etc. It is understood that the incoming message module 20 may actually be comprised of various separate components adapted to receive messages of different types, such as long- and short-code telephone calls and text messages, email messages or other electronic messages, etc. However, for ease of reference, such components are collectively referred to herein as the incoming message module 20. Incoming message module 20 receives an incoming message, as well as contact information associated with the message such as the sender's email address or telephone phone number. Anonymizer 25 then creates a unique user ID, and the user ID is associated with the sender's contact information in a database 30. Anonymizer 25 may create a random user ID, or may for example, use a cryptographic algorithm to encode the user's contact information into the user ID in such a way that the user's contact information is not identifiable from the user ID. The user is preferably not permitted to create its own user ID. If the sender's contact information is encrypted within the user ID, the database may need only store a key (or a portion of a key) for decrypting the user ID, along with the user ID itself.

Once the database 30 has stored the appropriate information, alert distributor 35 forwards the message and user ID to an appropriate administrative user 40, such as via email, telephone, text message, etc. As above, it is understood that the alert distributor 35 may be comprised of various separate components, as needed. Database 30 may also store information regarding the administrative users 40, such as permissions for which administrative user(s) 40 receive a message based on time of day or type of message received, etc. Alert distributor 35 preferably uses such permissions to appropriately route the message from user 10. Additionally, alert distributor 35 may send an alert text/email to the administrative user 40 notifying them of the message, or may directly route the message to the administrative user 40. Thus, the appropriate administrative user(s) 40 receive(s) the message, but do not have access to the contact information of the sender. The administrative users 40 may or may not be aware of the user ID at all. Regardless, as noted above, the original sender's contact information is not discernable from the user ID.

Administrative users 40 may determine that a response to the original sender 10 is warranted or necessary. System 1 therefore includes a response module 45, which receives a response message from an administrative user 40. As above, the message may be in the form of a voicemail message, a text message, or an email, such as via a dedicated telephone number or email address. However, the administrative user preferably responds via a web interface or mobile app which automatically transmits the user ID along with the response message back to the response module 45 of system 1. Response module 45 thereby receives the response message and associated user ID, and decoder 50 interacts with the database 30 to determine the original sender's contact information. As noted above, the decoder may actually use a key to decrypt the user ID to determine the original sender's contact information, or may simply access the database 30 if the user's contact information is stored directly therein. Response distributor 55 then transmits the response message to the original sender 10.

In this manner, two way communication between an anonymous user 10 and administrative users 40 is facilitated without the administrative user 40 knowing the identity of the anonymous user 10. The user 10 may or may not know the identity of the administrative user 40. In one embodiment, all subsequent messages to and from the original sender are associated with the user ID. It is noted that a new user ID may be created each time, although it has been found that using the same user ID helps to catalogue and keep track of such communication, especially within the scope of a single ongoing conversation or chain. Preferably, database 30 retains a log and copies of all communications.

Figure 2:
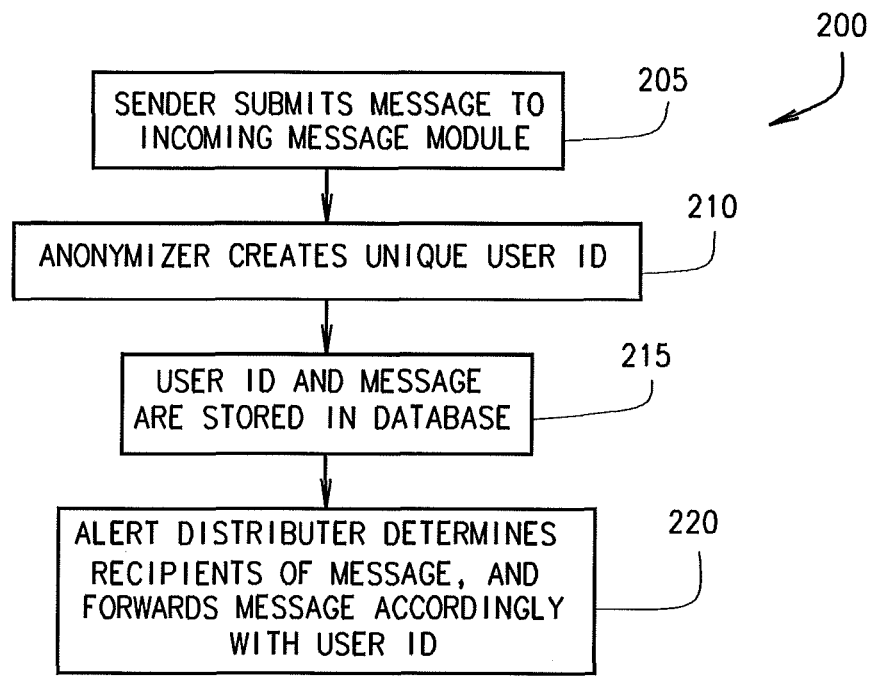
FIG. 2 is a flowchart depicting the message anonymization process

With respect to FIG. 2, an example process for anonymizing a message 200 is illustrated. At step 205, a sender 10 submits a message to the incoming message module 20. The message may be in the form of a voicemail, text, email, or in another electronic form, as would be understood. At step 210, anonymizer 25 creates a unique user ID. The user ID may be created by using a cryptographic algorithm on the sender's contact information, or may merely be a randomly generated user ID. The user ID and message are then stored in database 30 at step 215. It is noted that if a cryptographic algorithm is used to encrypt the user's contact information into the user ID, a key (or a portion of a key) may be stored to enable later decryption. Where the user ID is merely randomly generated, an association between the user ID and the user's contact information is preferably stored in database 30 as well. Next, at step 220, alert distributor 35 determines the proper recipients of the message based on permissions stored in the database, and forwards the message and user ID accordingly. Alert distributor 35 may transmit an alert to the relevant administrative users 40, notifying them of a new message in their online account, or may directly forward the message. In this way, the original sender's identity is kept secret from the administrative user.

Figure 3:
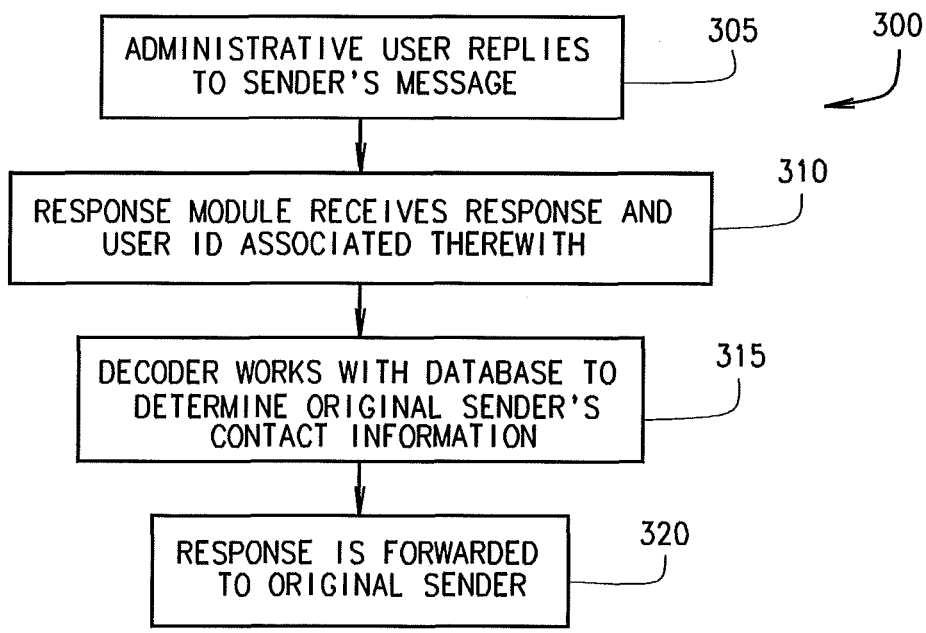
FIG. 3 is a flowchart depicting a process for responding to an anonymous message.

With respect to FIG. 3, an example process for responding to an anonymous message 300 is illustrated. At step 305, administrative user 40 replies to the sender's message. The reply is preferably sent via a web interface or mobile app which automatically includes the user ID. However, a response may be sent via standard text message, voicemail, email, etc. At step 310, response module 45 receives the response and user ID associated therewith. At step 315, the decoder 50 works with database 30 to determine the original sender's contact information. Where the user ID was created by encrypting the sender's contact information, the decoder 50 decrypts the user ID (for example, with a key stored in database 30) to reassemble the sender's contact information. Where the user ID is merely created randomly, the decoder 50 accesses the database 30 record which associates the user ID with the sender's contact information. Next, at step 320, response distributor 55 transmits the response message to the original sender. In this way, the administrative user is able to respond to the original sender without knowing the original sender's identity. Further correspondence proceeds in the same fashion as disclosed above.

As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A system for allowing anonymous communication comprising:
    at least one processor and electronic memory;
    an incoming message module stored in the electronic memory and executing on the at least one processor, wherein the incoming message module receives an incoming phone or text message from a sender;
    an anonymizer stored in the electronic memory and executing on the at least one processor, wherein the anonymizer generates a unique user ID based on contact information associated with the sender;
    a database stored in the electronic memory and executing on the at least one processor, wherein the database stores the user ID as associated with the sender's contact information; and
    an alert distributor stored in the electronic memory and executing on the at least one processor, wherein the alert distributor determines an appropriate administrative user to receive the message based on permissions, the permissions based on either time of day or type of message, and forwards the message to the appropriate administrative user,
    wherein a different user ID is created each time a message is received from the sender within a chain between the sender and the administrative user.

2. The system of claim 1 further comprising:
    a response module stored in the electronic memory and executing on the at least one processor, wherein the response module receives a response from the administrative user;
    a decoder stored in the electronic memory and executing on the at least one processor, wherein the decoder determines the sender's contact information; and
    a response distributor stored in the electronic memory and executing on the at least one processor, wherein the response distributor forwards the response to the sender.

3. The system of claim 2 wherein the anonymizer uses a cryptographic algorithm to encode the sender's contact information into the user ID.

4. The system of claim 3 wherein the decoder determines the sender's contact information by decoding the user ID.

5. A processor-implemented method for allowing anonymous communication comprising:
    an incoming message module receiving an incoming message via phone call or text message from a sender;
    an anonymizer generating an anonymous unique user ID based on contact information associated with the sender;
    a database storing the user ID as associated with the sender's contact information;
    an alert distributor determining an appropriate administrative user to receive the message based on permissions, the permissions based on either time of day or type of message; and
    the alert distributor forwarding the message to the appropriate administrative user,
    the anonymizer creating a different user ID each time a message is received from the sender within a chain between the sender and the administrative user.

6. The processor-implemented method of claim 5 further comprising:
    a response module receiving a response from the administrative user;
    a decoder determining the sender's contact information; and
    a response distributor forwarding the response to the sender.

* * * * *